United States Patent
Forman et al.

(10) Patent No.: US 8,266,179 B2
(45) Date of Patent: Sep. 11, 2012

(54) METHOD AND SYSTEM FOR PROCESSING TEXT

(75) Inventors: George Forman, Port Orchard, WA (US); Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 12/570,309

(22) Filed: Sep. 30, 2009

(65) Prior Publication Data

US 2011/0078152 A1    Mar. 31, 2011

(51) Int. Cl.
*G06F 17/00* (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| | | | |
|---|---|---|---|
| 5,875,264 A * | 2/1999 | Carlstrom | 382/181 |
| 6,839,680 B1 | 1/2005 | Liu et al. | |
| 7,085,271 B2 | 8/2006 | Gooch | |
| 7,126,948 B2 | 10/2006 | Gooch | |
| 7,145,911 B2 | 12/2006 | Gooch | |
| 7,707,206 B2 * | 4/2010 | Encina et al. | 707/716 |
| 2003/0101449 A1 | 5/2003 | Bentolila et al. | |
| 2008/0126176 A1 | 5/2008 | Iguchi | |

OTHER PUBLICATIONS

Ganchev, Kuzman, et al., "Small Statistical Models by Random Feature Mixing," Proceedings of the ACL-08 HLT Workshop on Mobile Language Processing, Columbus, OH, Jun. 20, 2008, pp. 19-20, Available at http://www.cis.upenn.edu/~mdredze/publications/mobile_nlp_feature_mixing.pdf (last accessed on Mar. 4, 2010).

Forman, George, et al., "Scaling Up Text Classification for Large File Systems," Proceedings of the 14th ACM SIGKDD International Conference on Knowledge Discovery & Data Mining (KDD'08), Aug. 2008.

Forman, George, et al., "Extremely Fast Text Feature Extraction for Classification and Indexing," Published at the Conference on Information & Knowledgement Management, Napa Valley, California, Oct. 27, 2008.

Lingpipe, "Symbols as Hash Codes for Super-fast Linear Classifiers," Blog available at http://lingpipe-blog.com/2008/03/25/symbols-as-hash-codes-for-super-fast-linear-classifiers/ (last accessed on Mar. 4, 2010).

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: "The Collective Intelligence Platform," Online, http://www.baynote.com/technology/platform/ 2010.

Hottolink Inc.; "Recognize" Online, http://www.hottolink.co.jp/english/reconize.html, 2009.

(Continued)

*Primary Examiner* — Isaac M Woo

(57) ABSTRACT

An exemplary embodiment of the present invention provides a method of processing an electronic text document. The method includes obtaining a character from the document. The method also includes obtaining a hash input code from a character map, the hash input code corresponding to the character. The method also includes modifying a hash value based on the hash input code if the hash input code indicates that the character is part of a token, or asserting the hash value if the hash input code indicates that character is not part of a token.

20 Claims, 6 Drawing Sheets

OTHER PUBLICATIONS

Andrejko et al.: "User Characteristics Acquisition from Logs with Semantics" 8. Slovak University of Technology in Bratislava.

Hongjun Lu et al: "Extending a Web Browser with Client-Side Mining," Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

\* cited by examiner

METHOD AND SYSTEM FOR PROCESSING TEXT

BACKGROUND

Automatic processing and analysis of electronic text documents has a wide variety of practical applications, for example, document classification, clustering, indexing, spam filtering, and the like. Generally, most textual analysis includes a text feature extraction process, which is used to determine the words or terms that occur in the electronic document. For example, a full-text indexing application may perform text feature extraction on large volumes of files or web pages. For another example, an Information Lifecycle Management (ILM) application may periodically apply classifiers to huge document repositories for content management, such as the application of automatic file retention, archiving and security policies. The text feature extraction process often uses a great deal of processing resources, particularly in large scale systems.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide techniques for processing electronic text documents. As used herein, the term "exemplary" merely denotes an example that may be useful for clarification of the present invention. The examples are not intended to limit the scope, as other techniques may be used while remaining within the scope of the present claims.

In exemplary embodiments of the present invention, a method of processing an electronic text document includes a technique for extracting text features from an electronic document. Generally, text feature extraction may involve extracting character strings from the document, storing the character strings in an array, normalizing the strings, and storing the strings to a repository such as a feature vector or an index record. Each scan of the document and the individual text strings consumes a large amount of processing resources. Accordingly, reducing the computation and memory demands used to index a document is a desirable goal.

In exemplary embodiments of the present invention, a single scan is used to index an electronic text document. During the scan, each character may be used to generate incremental hash values corresponding to features in the document, and the hash values may be stored to one or more output components, such as index records or feature vectors as the scan progresses. By storing hash values rather than text strings, multiple scans of the individual text strings may be avoided. Furthermore, in some exemplary embodiments, a classification score is also computed during the scan. In this way, the classification score may be generated much faster compared to techniques that perform traditional string processing of the document text. The scan results generated in accordance with exemplary embodiments of the present invention may be used in a wide variety of applications, including, but not limited to, full-text indexing, document classification, and spam filtering, for example. As used in the present specification, the term "token" is used to refer to any character or group of characters that may be processed together to form a single hash value. Thus, a token may include a word, word phrase, single number, a string of numbers, a word character such as a Chinese character, and the like.

Figure 1:
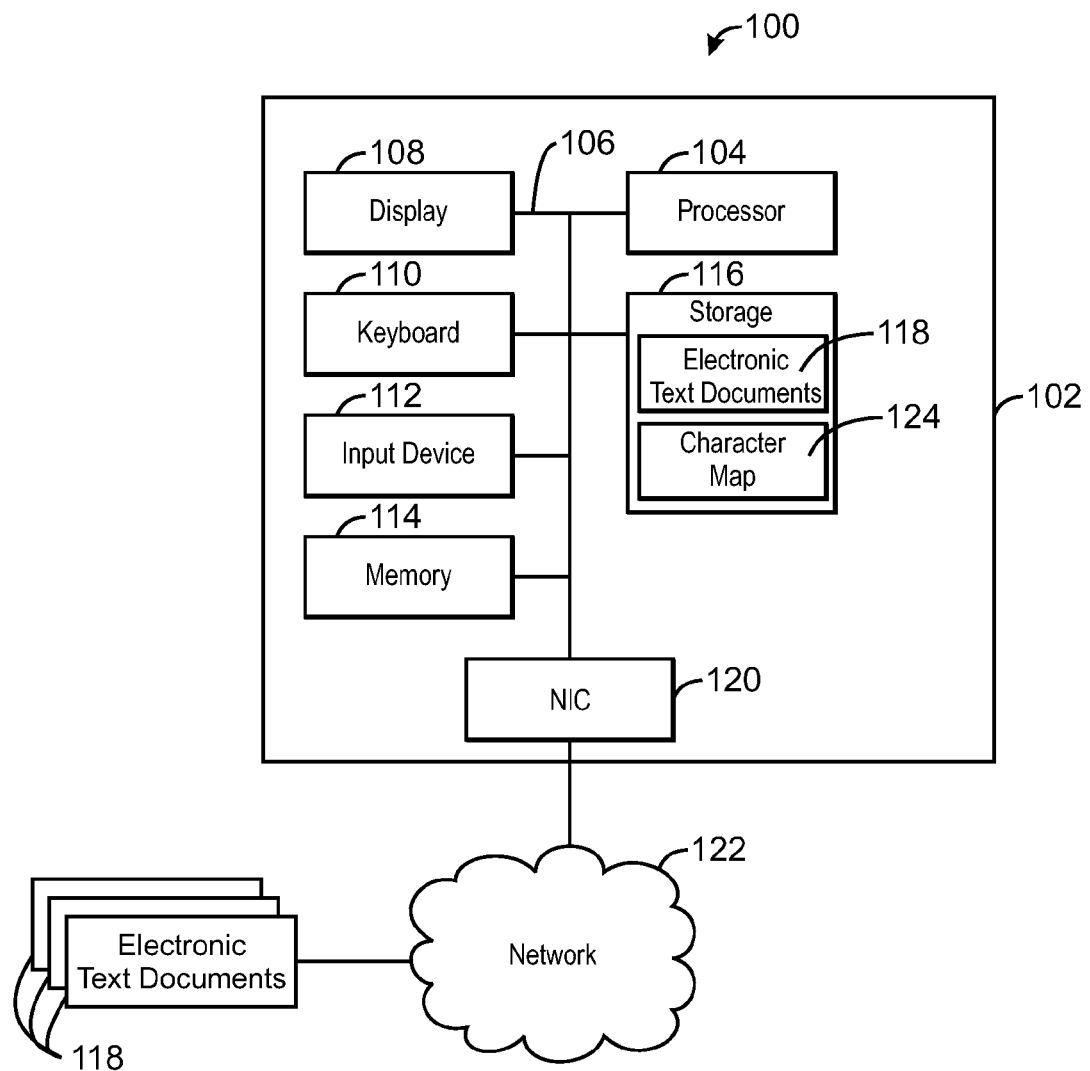
FIG. 1 is a block diagram of a system adapted to automatically extract text features from an electronic text document, in accordance with exemplary embodiments of the present invention.

FIG. 1 is a block diagram of a system adapted to automatically extract text features from an electronic text document, in accordance with exemplary embodiments of the present invention. The system is generally referred to by the reference number 100. Those of ordinary skill in the art will appreciate that the functional blocks and devices shown in FIG. 1 may include hardware elements including circuitry, software elements including computer code stored on a tangible, machine-readable medium or a combination of both hardware and software elements. Additionally, the functional blocks and devices of the system 100 are but one example of functional blocks and devices that may be implemented in an exemplary embodiment of the present invention. Those of ordinary skill in the art would readily be able to define specific functional blocks based on design considerations for a particular electronic device.

As illustrated in FIG. 1, the system 100 may include a computing device 102, which will generally include a processor 104 connected through a bus 106 to a display 108, a keyboard 110, and one or more input devices 112, such as a mouse, touch screen, or keyboard. In exemplary embodiments, the device 102 is a general purpose computing device, for example, a desktop computer, laptop computer, business server, and the like. In other exemplary embodiments, the device 102 is a hand-held device, for example, a mobile phone with Internet access, a personal data assistant (PDA), e-book reader, and the like.

The device 102 can also have one or more types of tangible, machine-readable media, such as a memory 114 that may be used during the execution of various operating programs, including operating programs used in exemplary embodiments of the present invention. The memory 114 may include read-only memory (ROM), random access memory (RAM), and the like. The device 102 can also include tangible, machine-readable storage media, such as a storage system 116 for the long-term storage of operating programs and data, including the operating programs and data used in exemplary embodiments of the present invention. The storage system 116 may also store any type of electronic text documents 118, for example, PDF documents, Microsoft® Word documents, Web pages, HTML documents, XML documents, e-mails, transcripts of audio, optical character recognition (OCR)

transcriptions of scanned physical documents, and the like. Furthermore, the electronic text document 118 may also include text entered into a data field, for example, a set of search terms entered into a query field or a web form, log entries, string fields in databases, product descriptions, customer comments, and the like.

In exemplary embodiments, the device 102 includes a network interface controller (NIC) 120, for connecting the device 102 to a network 122, such as a local area network (LAN), a wide-area network (WAN), or another network configuration. The network 122 can include routers, switches, modems, or any other kind of interface device used for interconnection. Through the network 122, the device 102 can access additional electronic documents 118. The electronic documents 118 may be received from a Website server, enterprise server, database server, client computers, personal computers, and the like.

Further, the storage system 116 may also include a character map 124 that may be used during the scanning of an electronic text document 118 to generate hash values, as discussed below with reference to FIG. 2. The character map 124 associates each text character with an associated "hash input code" and may be used as a lookup table during the scanning of a document. The character map 124 may be generated from a standard character set such as the American Standard Code for Information Interchange (ASCII) character set, the ISO 8859-1 character set, the Unicode character set, the Universal Character Set (UCS) defined by ISO/IEC 10646, and the like. Each character's entry in the character map 124 may include an associated hash input code as well as an associated "character class." As used herein, the term "character indicator" is used to refer to the value assigned to a particular character within the character set, according to the conventions of the character set. The character indicator is used to identify the corresponding entry in the character map 124 (for example, the character indicator for 'A' is 65 in ASCII, or 193 in EBCDIC). When the term "character" is used in contexts that imply a numeric value (for example, when using the character to index an array or examining the constituent bytes of a character), this should be understood to refer to the character's indicator. The term "hash input code" is used to refer to another value that is retrieved from the character map and used to modify the hash value.

To generate the character map, each of the characters in the character set may be converted to a corresponding hash input code that is suitable for generating incremental hash values. Interchangeable characters, that is, characters that have differences that are insignificant for a particular task, may be assigned identical hash input codes. For example, upper case and lower case letter characters may be assigned the same hash input code. In other embodiments, the accented and unaccented form of a character is assigned the same hash input code. Thus, two or more interchangeable characters may each have their own entry in the character map, but the hash input codes stored in the entries may be identical.

The hash input codes for non-letter characters, such as punctuation or space characters, may be set to zero or some other value that identifies the character as a non-token character. In some exemplary embodiments, the numerical characters are treated like punctuation and assigned a hash input code of zero. In other exemplary embodiments, numerical characters are treated like letters and assigned a non-zero hash input code. Furthermore, some non-letter characters that are generally used to join words in a document may also be treated as letter characters and assigned a non-zero hash input code. For example, dashes, hyphens, slashes, and the like may be assigned non-zero hash input codes so that word phrases such as "ioctl-32win" or "HP/UX", for example, may be processed as a single word.

In some exemplary embodiments, the hash input codes are deterministic randomized values. Such values have two properties: first, the distinct values are uniformly (or approximately uniformly) distributed across the range of possible values, and second, the values corresponding to each character can be determined based only on constant input that can be obtained each time the character map is generated. In some exemplary embodiments, deterministic randomized values are generated by initializing a deterministic pseudo-random-number generator (e.g., the Java Random class or a more sophisticated algorithm such as a Mersenne Twister) using a shared constant seed value. This pseudo-random number-generator may be used to generate a table of numbers, one per character. To generate the character map, each character determined to be a token character may be normalized to a canonical equivalent character (e.g., by lowercasing and removing accents), and the value in the table corresponding to the canonical equivalent character may be used as the hash input code for the original character. In another embodiment, two or more 256-element tables of pseudo-random numbers are generated, one corresponding to each byte in a character indicator. In such an embodiment, the character indicator for the canonical equivalent character is split into bytes, each byte is used as an index into the corresponding table, and the indicated values are combined, e.g., by XORing, to create the hash input code. In some embodiments, each table (or each table but the one corresponding to the leastsignificant byte) is constructed so that the value corresponding to a byte with value zero is zero.

In some exemplary embodiments, each hash input code is associated with a character class, which may be used to differentiate between different character types, for example, number characters, letter characters, or word characters such as Chinese characters. As discussed below in reference to FIG. 3, the character class may be used during the scanning of a document 118 to separate text strings that are to be treated separately even though they may not be separated by a non-word character, such as a space, in the document 118. For example, the character class may be used to separate the text string "HP1234" into two distinct hash values corresponding with "HP" and "1234."

If the character set is a two-byte character set, the entire character set may be compiled into a full character map of the entire character set. In other exemplary embodiments, the two-byte character set is treated as 256 subsets, each including 256 characters, and a partial character map is generated from one or more of the subsets on demand. In this way, uncommon characters may be added to the character map only when encountered in a document 118, which may lower computing and storage demands for typical documents. In such an embodiment, the partial character map includes a table of 256 character sub-maps, one for each subset. To identify the hash input code corresponding to a character in the partial character map, the high-order byte of the character's indicator is used to identify the corresponding character sub-map. If this sub-map exists, the low-order byte is used to index into the sub-map and obtain the hash input code. If the sub-map does not yet exist, the sub-map may be constructed as described above. A simple inequality test may be used to determine whether a character's high-order byte is zero. In some embodiments, if the high-order byte matches the most-recently-encountered non-zero high-order byte, a cached sub-map is used rather than checking whether the corresponding sub-map exists. Furthermore, it will be appreciated that the techniques described above for generating the character map may be extended to characters whose indicators include more than two bytes.

Figure 2:
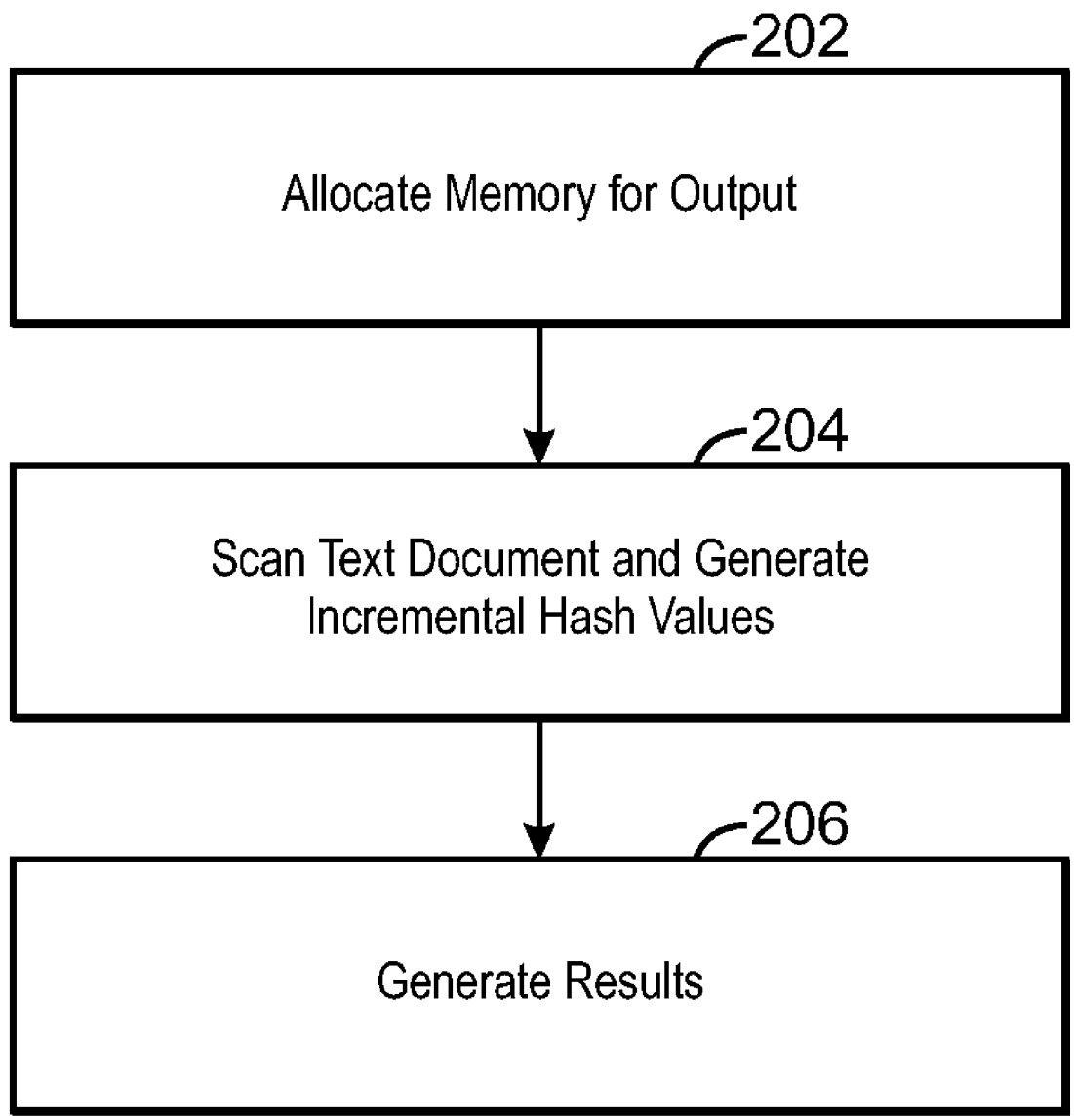
FIG. 2 is a process flow diagram of a method of processing an electronic text document, in accordance with exemplary embodiments of the present invention.

FIG. 2 is a process flow diagram of a method of processing an electronic text document, in accordance with exemplary embodiments of the present invention. The method is generally referred to by the reference number 200, and describes an overview of the methods described in relation to FIGS. 3A, 3B, and 4. Method 200 may begin at block 202, wherein memory is allocated for the output that may be generated for the document 118, for example, an index record, a table of classifier scores, and the like. In some exemplary embodiments, memory is allocated for a feature vector.

The feature vector may be an array of Boolean or integer values or other values which can be used to determine a Boolean or integer value. Each array position in the feature vector may be accessed by a hash value corresponding with a token that may be identified in text document 118. The size of the feature vector array, W, may be any suitable size that accommodates a range of hash values, the range determined by the number of expected distinct tokens, the tolerance to hash-value collision, and the amount of memory available. Further, the feature vector may also be initialized so that each position in the array indicates the absence of a feature or a count of zero. This may be accomplished by setting each value to false or zero. In another exemplary embodiment, the indices corresponding to true or non-zero values are kept external to the array and only these positions set to false or zero when the feature vector is re-initialized. In another exemplary embodiment, the values in the array are integers or pointers that represent true or false based on their equality or inequality to an external value. In such an embodiment, initializing (or reinitializing) the feature vector may include changing this external value to one not in the array (or probabilistically unlikely to be in the array) as by incrementing it, generating a pseudo-random number, reading a clock, or using a pointer or serial number referring to the document to be processed. A similar mechanism may be used to hold integer values in the feature vector. In this case, each position in the feature vector may hold an integer value and a secondary value that may or may not be equal to an external value. The integer value corresponds to a value of zero when the secondary value does not equal the external value.

Next, at block 204, an electronic text document 118 may be scanned. During the scanning of the document 118, each character may be received and processed sequentially, according to the order that the characters appear in the document 118. Certain characters, such as spaces and punctuation, may be used to identify the end of individual words or tokens, which may be processed as they are identified. In some exemplary embodiments, each token is stored to an index record for full-text indexing. In other exemplary embodiments, each token is added to a feature vector used for document classification.

Each token may be represented by a hash value that may be generated incrementally using the hash input codes stored in the character map 124. Each time a new character is acquired from the document 118, the character indicator may be used to identify the corresponding hash input code and character class from the character map 124. The hash input codes may be used to generate incremental hash values for each token in the document 118 as the scan progresses. For example, if the hash input code is indicative of a token character, for example, a letter in a word, and the character class is the same as the most recent character class, the hash value may be modified based on the hash input code. Furthermore, the hash input codes or the character classes may be used to determine the ending points of the tokens. For example, if the hash input code is indicative of a non-token character, for example, a space, or the character class is different from the most recent character class, this may indicate that full token has been identified. At this stage, the hash value may be asserted, for example, stored to a feature vector, and the hash value reset before acquiring the next character in the document 118.

Asserting the hash value may include various operations depending on system design considerations. In exemplary embodiments of the present invention, asserting the hash value includes storing the hash value to an index record used in full-text indexing. In this way, each token from the electronic text document 118 may be represented in the index record as an integer hash value rather than a text string. After performing the scan, the index record may be sorted and added to a reverse index, as described below in reference to block 206.

In other exemplary embodiments of the present invention, asserting the hash value includes modifying a feature vector. Before modifying the feature vector, the hash value may undergo a modulo W operation, wherein W equals the number of array positions in the feature array. In this way, the magnitude of the hash value may be reduced to match the size of the array to which it is asserted, for example, to select a deterministic-random position in the array. Similar magnitude reduction may be employed when the hash value is used as an index into other data structures. In embodiments in which W is a power of 2, the modulo operation may be performed by ANDing the hash value with a bitmask or otherwise truncating the number of bits it contains.

In some exemplary embodiments, the feature vector stores a Boolean value that indicates whether the feature is present in the document 118, regardless of the number of times the feature appears in the document 118. Accordingly, each time a hash value is asserted, the value at the feature vector position corresponding to the hash value may be set to "true" or a number, such as one, indicative of a true value. In some embodiments, when the position has previously had a value corresponding to false, the (possibly reduced) hash value is stored in a list external to the array to facilitate identifying the position for resetting to false before the feature vector may be used to process another document. In another embodiment, the position is set to have an externally-specified value, where equality with the externally-specified value indicates the value "true."

In other exemplary embodiments, the feature vector stores integer values for storing counts of feature occurrences. Accordingly, each time a hash value is asserted, the value at the feature vector position corresponding to the hash value may be incremented by one. In some embodiments, when the position has previously had a value zero, the (possibly reduced) hash value is stored in a list external to the array to facilitate identifying the position for resetting to zero before the feature vector may be used to process another document. In another embodiment, the position also contains a second value which may be tested for equality with an externally-specified value, where inequality with the externally-specified value indicates that the position contains a count of zero. In such an embodiment, when a hash value is asserted, a check is made to determine whether this second value is equal to the externally-specified value. If the second value is equal to the externally-specified value, the count at that position is incremented by one. If the second value is not equal to the externally-specified value, the second value is set to the externally-specified value and the count is set to one. Numeric types other than integers and modification operations other than incrementing by one may be employed.

In some embodiments, the feature vector is implemented as a Bloom filter, which includes a number of bits, each addressable by a number. The hash value, which may be large (e.g., 64 or 128 bits) or used to induce a large number of bits (e.g., by being used to seed a random number generator), may be partitioned into several smaller sequences of bits. To indicate the presence of a feature corresponding to the hash value, the bits in the Bloom filter corresponding to each of these smaller sequences are set to one. To determine whether the feature vector contains the feature corresponding to the hash value, the bits corresponding to each of the smaller sequences are checked. If any bits have the value zero, the answer is "no." If all bits have the value one, the answer is "one," although it may be incorrect. Other representations, such as open hash tables, may also be used.

Next, at block 206, results are generated for the document scan. The results generated may vary depending system design considerations. In an exemplary embodiment of the present invention, the document scan results in an index record that may be used for full-text indexing of the document 118, as described above in reference to block 204. The resulting index record may include integer hash values corresponding to each token retrieved from the document 118. Furthermore, the hash values may be stored in the same order that the corresponding tokens appear in the document 118. The index record may be sorted and added to a reverse index that includes index records corresponding with several electronic text documents 118. The reverse index may be stored in an electronic storage medium, for example, the storage system 116 of FIG. 1. If a user subsequently performs a search, the search terms may be processed according to the method described above in relation to block 204, with the exception that the hash values are stored to a search vector that includes a set of one or more hash values corresponding to the search terms. The search vector may then be used to search the reverse index to identify electronic documents 118 within the reverse index that contain the search terms. The identified documents may be included in a list of matching documents, which may be displayed, for example, on the display 108 of FIG. 1.

In other exemplary embodiments of the present invention, the scan results in a feature vector but no corresponding classification score. Accordingly, the feature vector may be analyzed to determine whether the document 118 belongs to a specified class. In some embodiments, a classification score is computed for the feature vector and compared to a classification threshold to determine whether the document 118 is of the specified class. The classification score may be computed using a pre-determined array of weight values corresponding to a specified document class. Each array position in the weight array may relate to a corresponding array position in the feature vector. The array of weights may be determined by known-manner machine learning classification techniques, such as NaïBayes or linear Support Vector Machines. The array of weights may be multiplied by the feature vector to generate a dot product of the two arrays. The dot product of the two arrays may be used as a total classification score for the document 118. The classification score may then be compared to a classification threshold corresponding to the specified document class to determine whether the scanned document 118 belongs to the specified document class. In some exemplary embodiments, a plurality of weight arrays is provided for computing a plurality of classification scores that may be used to identify the document 118 as belonging to one or more specified classes. The one or more weight arrays may be stored in the storage memory 116 of FIG. 1.

After a document class has been identified for the document, a computer may automatically perform an action based on the identified class. For example, the document may be selectively filed, tagged, and/or displayed based the document class. For example, if the document is an email and the document class indicates that the email is spam, the document may be stored in a spam folder of the user's email application operating, for example, on the computing device 102. As another example, the document may be placed in a particular storage location, for example a folder or device within storage 116, or be determined to be subject to a particular document management policy based on the document class. As a further example, the document may be associated with one or more tags related to the document class in an index so that users searching for documents so tagged or users who have indicated an interest in being notified of documents so tagged will be made aware of the document. Additionally, a visual representation of the document may be generated that provides a visual indication of the document class, for example, on the display 108 of FIG. 1.

Furthermore, in some exemplary embodiments, the classification score is computed based on a predetermined subset of features from the feature vector that are known to be more indicative of a specified class. Accordingly, exemplary embodiments of the present invention include a feature selection technique to determine the subset of index positions that are used to generate the classification score. As would be known by those of ordinary skill in the art, many known-manner feature selection techniques are suitable, such as "filter techniques," which select the set of features having the largest scores, each feature's score being determined independently via a formula such as information gain, chi squared, or bi-normal separation. The subset of index positions and corresponding weight values may be stored in the storage memory 116 of FIG. 1. To compute the classification score, the feature vector values corresponding to the index positions corresponding to the selected features may be iteratively obtained and multiplied by the corresponding weight value. The product of the feature vector value and the weight value may be added to the total classification score. If the total classification score is greater than the classification threshold, the document 118 may be flagged as belonging to the specified class. Furthermore, as described below in reference to FIG. 3, asserting the hash value may also include computing one or more classification scores during the scanning of the document.

Figure 3A:
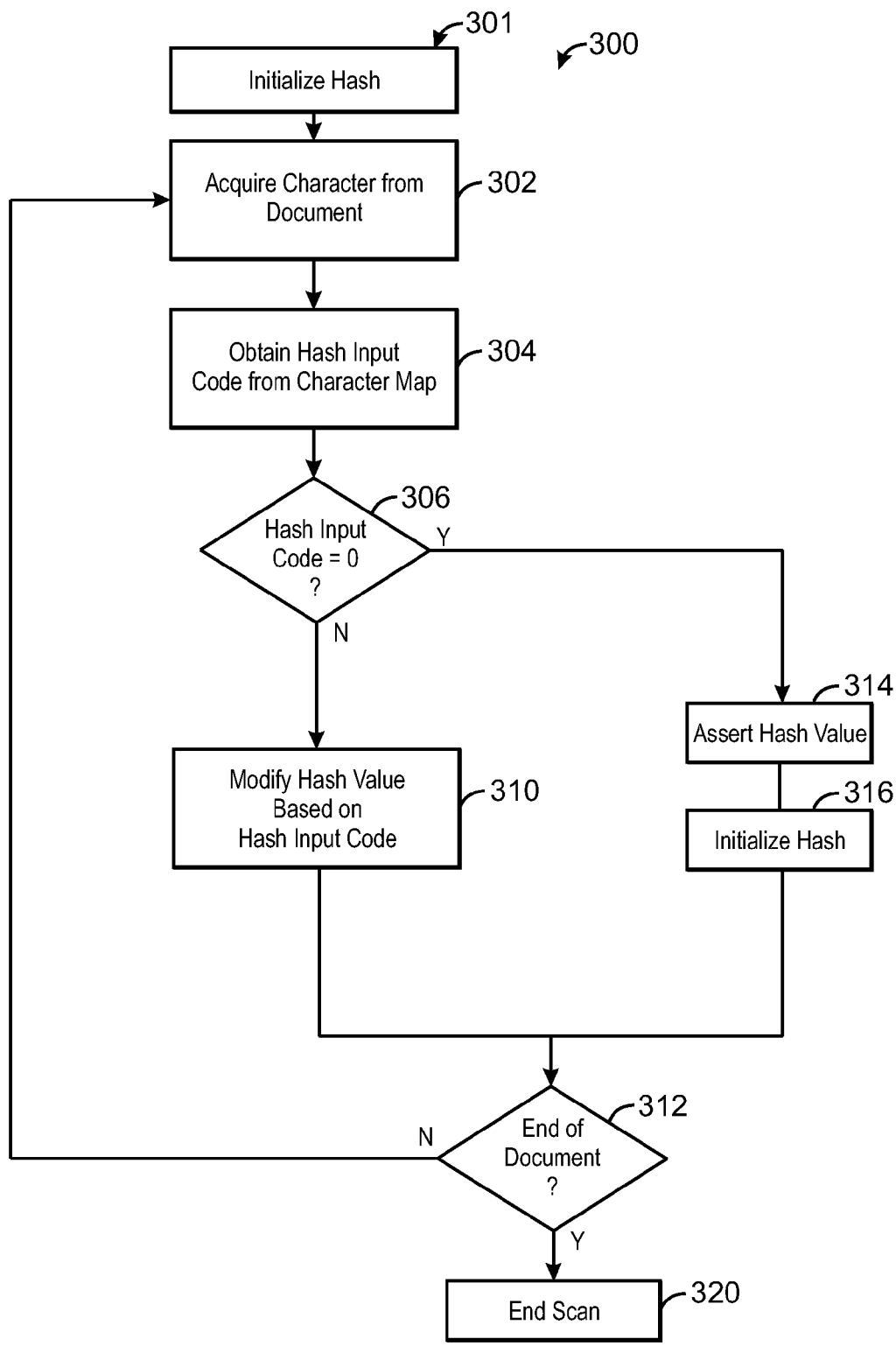
FIG. 3A is a process flow diagram of a method of scanning an electronic text document, in accordance with exemplary embodiments of the present invention.

FIG. 3A is a process flow diagram of a method of scanning an electronic text document, in accordance with exemplary embodiments of the present invention. The method is generally referred to by the reference number 300 and corresponds with step 204 of FIG. 2. The method may begin at block 301, wherein the hash value is initialized by setting the hash value to zero or any other value that identifies the hash value as being an initial hash value. Furthermore, the initial hash value may be different for different iterations of the process. The method 300 may then advance to block 302, wherein a character is acquired from an electronic text document 118. The character obtained from the document 118 may be represented by a character indicator, as described above in reference to FIG. 1.

Next, at block 304, a hash input code corresponding to the character may be obtained from the character map 124. It should be noted that during the scanning of the document 118, the hash input code returned from the character map for uppercase and lowercase letter characters are identical. Therefore, converting the letter characters from the document 118 to lowercase during the scanning of the document 118 may not be required, thus reducing the computer processing load involved in the scan.

At block 306, the hash input code is evaluated to determine whether the scan has progressed beyond the end of a token. If the hash input code is a non-zero value, the process flow may advance to block 310, wherein the current hash value is modified using the hash input code. In some embodiments, the hash input code for non-token characters is a value other than zero. For example, the hash input code for non-token characters may be a specific non-zero value or may include a range of values or any value having a particular pattern in some of the bits.

At block 310, the hash value is modified using the hash input code returned from the character map 124 (FIG. 1) at block 304. The modification of the hash value may be accomplished using an incremental hash function, for example, a Rabin hash function, and the like. In some exemplary embodiments, the modification of the hash value is accomplished using a hashing function, according to the following formula:

$$hash = (31 \cdot hash + hash\ input\ code) \bmod 2^n$$

the above formula, "hash" equals the current hash value, "hash input code" equals the current hash input code returned from the character map 124, and n equals the number of bits in the hash value.

In general, the incremental computation may be accomplished in two steps. First, the current hash value is modified, as by multiplying or dividing by a constant, or shifting or rotating bits left or right. Second, the new hash input code is injected into the hash value, as by adding, subtracting, or XORing it with the modified current hash value. The modification procedure may change for different positions in the input. For example, a table may be used to determine one constant to multiply by when injecting the first hash input code and a different constant to multiply by when injecting the second hash input code. In some exemplary embodiments, the current hash value is modified by performing a right shift of one bit and the hash input code is injected by adding it to the result. When provided as a primitive operation by the underlying platform, modifying the current hash value may be accomplished by rotating rather than shifting, as it does not result in loss of information. After modifying the hash value, the process flow may advance to block 312, wherein a determination is made regarding whether the scan has reached the end of the document 118.

Returning to block 306 wherein the hash input code is evaluated, if the hash input code equals zero, this may indicate that the scan has progressed beyond the end of a token, and the process flow may advance to block 314, wherein the current hash value may be asserted. Within block 314, a determination may be made to determine whether the hash value equals zero, which may occur if two non-token characters in a row are encountered in the document 118. If the hash value is zero, the assertion of the hash value may be skipped. Otherwise, the hash value may be asserted. As stated above in reference to FIG. 2, asserting the hash value may include various operations depending on the system design considerations. For example, asserting the hash value may include putting the integer hash value in a new index record for full-text indexing, modifying a feature vector based on the hash value, and the like. In some embodiments, the action to be taken is embodied in a callback object passed in as a parameter to method 300. In such an embodiment, asserting the hash value may include invoking the callback object and passing the hash value as a parameter. In such embodiments, the hash value may be computed in a much larger space (e.g., 32 or 64 or more bits), counting on the invoked callback object to use bit masking or other means to reduce it to a suitable size.

Furthermore, in exemplary embodiments of the present invention, the classification score is generated concurrently with the feature identification during the scanning of the document 118, rather than at the end if the scan. Accordingly, asserting the hash value may also include applying the hash value to the array of weights to obtain the weight value stored at the array position corresponding to the hash value. The obtained weight value may then be added to the total classification score, which may be compared to the classification threshold after the completion of the scan to determine whether the document 118 belongs to the specified class. In embodiments wherein the weight reflects the presence of the feature rather than the count of the number of times the feature occurs, the weight may be added to the total classification score only when the feature is encountered in a document for the first time. To ensure that each weight is added once, the features encountered may be recorded (as when constructing a feature vector) and the weight may be added for features that had not previously encountered. In another embodiment, the weight is set to zero after the first time it is added to the total classification score. In such an embodiment, the positions that have been set to zero and their corresponding weights may be recorded, so that the positions may be reset to the correct values for the next document.

In some exemplary embodiments, multiple classification scores for multiple classes are determined simultaneously. This may involve multiple arrays of weights, one per class, or it may involve a single array, each position of which holds an object that indicates a weight for each class or for each class that has a non-zero weight for the corresponding feature. In such an embodiment, features which correspond to zero weights for all classes may have a null pointer value in the array of weights. Furthermore, in embodiments wherein the weights are applied once only, this may be accomplished by setting the position in the array of weights to the null pointer after adding the weights for each class to the classification scores. Furthermore, the position and a pointer to the original object may be recorded so that the array may be restored to its original value prior to processing the next document.

In exemplary embodiments wherein the classification score is computed based on normalized counts of feature occurrences, the weight values obtained from the weight array may be factored into the classification score regardless of whether the feature has previously been identified in the document 118. In such an embodiment, computing the classification score may take the place of generating a feature vector, and the generation of the feature vector may be eliminated. In this case, asserting the hash value may include applying the hash value to an array of weights to obtain the weight value stored at the array position corresponding to the hash value and adding the weight to the classification score. Additionally, a word counter may be incremented each time a hash value is asserted. After completing the document scan, the total classification score may be divided by the word count to obtain a normalized classification score, which may be compared to the classification threshold to determine whether the document 118 belongs to the specified class.

In another exemplary embodiment, a running approximation of the normalized classification score is computed after each assertion of a new hash value. A running approximation of the normalized classification score may be computed by the following formula:

$$\text{Score} = \text{Score} \cdot \frac{n-1}{n} + \frac{\text{new}}{n}$$

In the above formula, "Score" equals the running approximation of the normalized classifications score, "n" equals the new token count, and "new" equals the new value to be added to the normalized classification score.

In some embodiments wherein a classification score is computed during the scanning of the document 118, the classification score may be evaluated after each assertion of a new hash value to determine whether the classification score is greater than a predetermined classification threshold for the specified class. If the classification score exceeds the threshold at any stage during the scanning of the document 118, the scan may be terminated and the document 118 may be flagged as belonging to the specified class.

After the hash value has been asserted, the process flow of method 300 may advance to block 316, wherein the hash value is initialized as described in block 301. The process flow then advances to block 312, wherein a determination is made regarding whether the scan has reached the end of the document 118. If the scan has not reached the end of the document 118, the process flow may return to block 302, wherein the next character is acquired from the document 118. If the scan has reached the end of the document 118, the process flow may advance to block 320, wherein the scan is terminated. Furthermore, upon terminating the scan, if the hash value is a non-zero value, the hash value may be asserted as discussed in relation to block 314. In this way, the last token may be captured if the document 118 ends with a token character. After terminating the scan, the results of the scan may be processed as discussed above in relation to block 206 of FIG. 2, depending on the system design considerations.

Figure 3B:
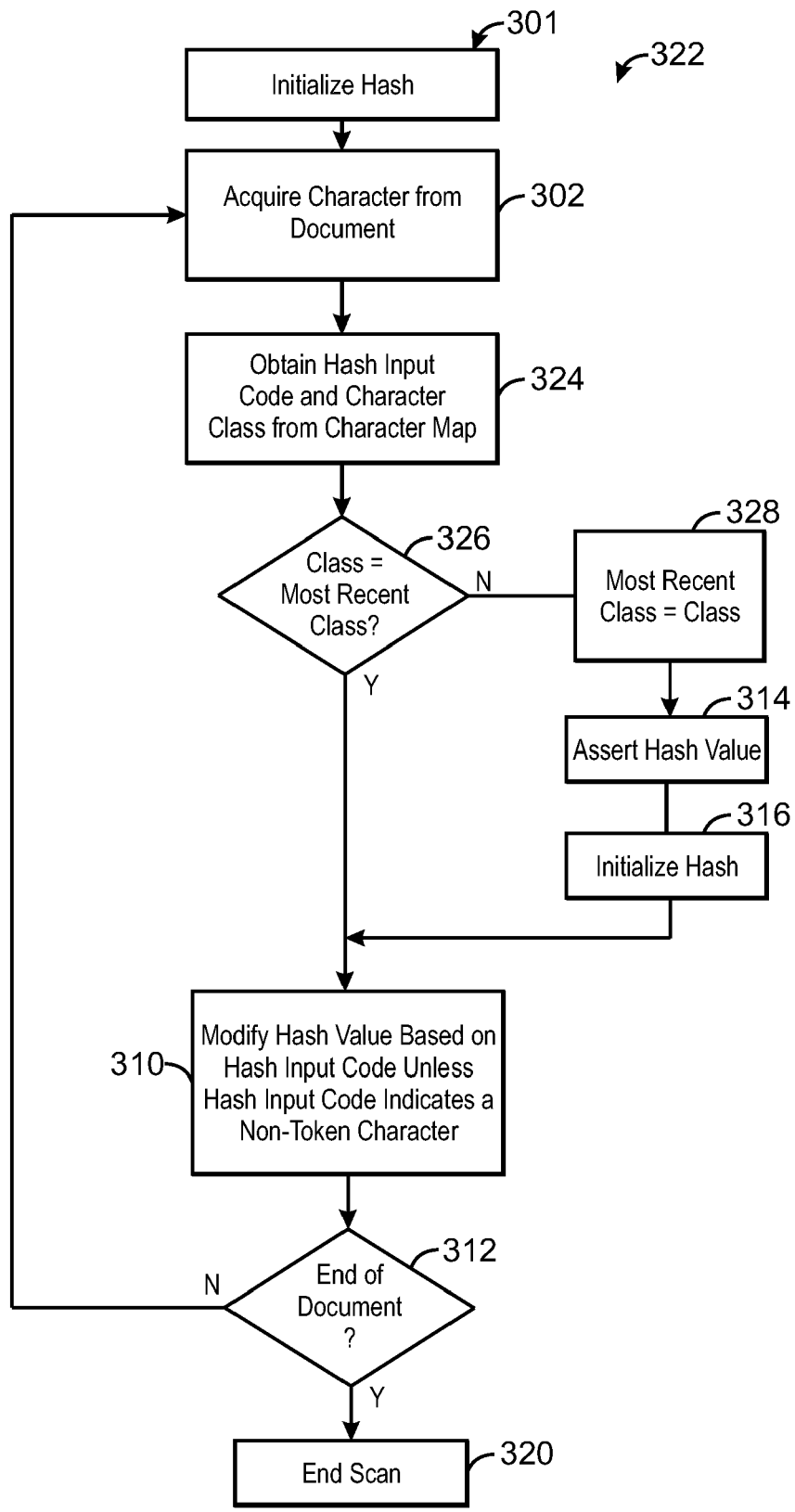
FIG. 3B is a process flow diagram of another method of scanning an electronic text document, in accordance with exemplary embodiments of the present invention.

FIG. 3B is a process flow diagram of a method of scanning an electronic text document, in accordance with exemplary embodiments of the present invention. The method is generally referred to by the reference number 322 and corresponds with step 204 of FIG. 2. The method may begin at block 301, wherein the hash value is initialized, as discussed in relation to FIG. 3A. At block 302, the next character is acquired from the text document, as described in relation to FIG. 3A. At block 324, a hash input code is obtained from the character map, as described in relation to block 304 of FIG. 3A. Furthermore, at block 324 a character class corresponding to the character is obtained from the character map.

At block 326, the hash input code and character class may be evaluated to determine whether a new character class or a non-token character has been encountered. The determination that the character is a non-token character may be made based on the hash input code (for example, the hash input code being zero as described in relation to block 306 in FIG. 3A) or based on the character class. A class indicator may be used to indicate the most recent character class encountered during the scan of the text document. If the character obtained at block 302 is the first character encountered in the text document, then the class indicator may have been initialized to a value that does not correspond to the character class of any character. The character class obtained at block 324 may be compared to the class indicator to determine whether the character class is the same as the most recent class encountered in the document. If the character class equals the class indicator, the process flow may advance to block 310, wherein the hash value may be modified, as described in relation to FIG. 3A. Thus, the hash value may be modified at block 310 if the character class remains unchanged.

If, at block 326, the character class is different from the class indicator or the character is not a token character, then the process flow may advance to block 328. At block 328, the class indicator may be set to the current character class and the process flow advances to block 314, wherein the current hash value may be asserted, as discussed above in relation to FIG. 3A. In some embodiments, the class indicator is not set in block 328 when the character is a non-token character. Thus, the hash value may be asserted if a new character class or a non-token character is encountered during the scan. In some embodiments, characters associated in the character map with a certain character class (or classes) are processed individually. For example, a character class indicating Chinese characters, which are not typically separated by spaces in sequential text words, may be individually processed by asserting each individual character as a token. When such a class is encountered, the class indicator may be set to a value that does not correspond to the class of any character so that each character with this class will result in asserting a hash value. In some such embodiments, a hash value is asserted after every n characters of the same class in sequence. This may be accomplished by keeping a count, n, of the number of such characters seen in the current sequence. In this case, the decision block 326 may branch to block 310 for the first n−1 characters in the sequence and branch to block 328 for the $n^{th}$ such character. In some embodiments, multiple hash values are created in parallel for such sequences utilizing a rolling window. For example, if the characters "W", "X", "Y", and "Z" are of a class for which overlapping bigrams (sequences of two characters) are to be processed as tokens, the sequence "WXYZ" would result in executing block 314 to assert hash values for "WX", "XY", "YZ", and "Z".

After asserting the hash value at block 314, the process flow may advance to block 316, wherein the hash value is initialized, as described in relation to block 301. The process flow then advances to block 310, wherein the hash value is modified based on the hash input code, as described in relation to FIG. 3A, unless the hash input code or the character class indicates that the current character is a non-token character. The process flow may then advance to block 312.

At block 312, a determination is made regarding whether the scan has reached the end of the document 118. If the scan has not reached the end of the document 118, the process flow may return to block 302, wherein the next character is acquired from the document 118. If the scan has reached the end of the document 118, the process flow may advance to block 320, wherein the scan is terminated. Furthermore, upon terminating the scan, if the hash value is a non-zero value, the hash value may be asserted as discussed in relation to block 314. In this way, the last token may be captured if the document 118 ends with a token character. After terminating the scan, the results of the scan may be processed as discussed above in relation to block 206 of FIG. 2, depending on the system design considerations.

In the exemplary embodiments described in relation to FIGS. 3A and 3B, additional hash values may be generated for tokens that represent multiple-word combinations, for example, two word phrases, and the like. The single-token hash values and multiple-token hash values may be generated in parallel during the scanning of the document. Furthermore, in some exemplary embodiments, the multiple-word hash values are generated by combining the two most recent single-word hash values into a single hash value, as described below in relation to FIG. 4.

Figure 4:
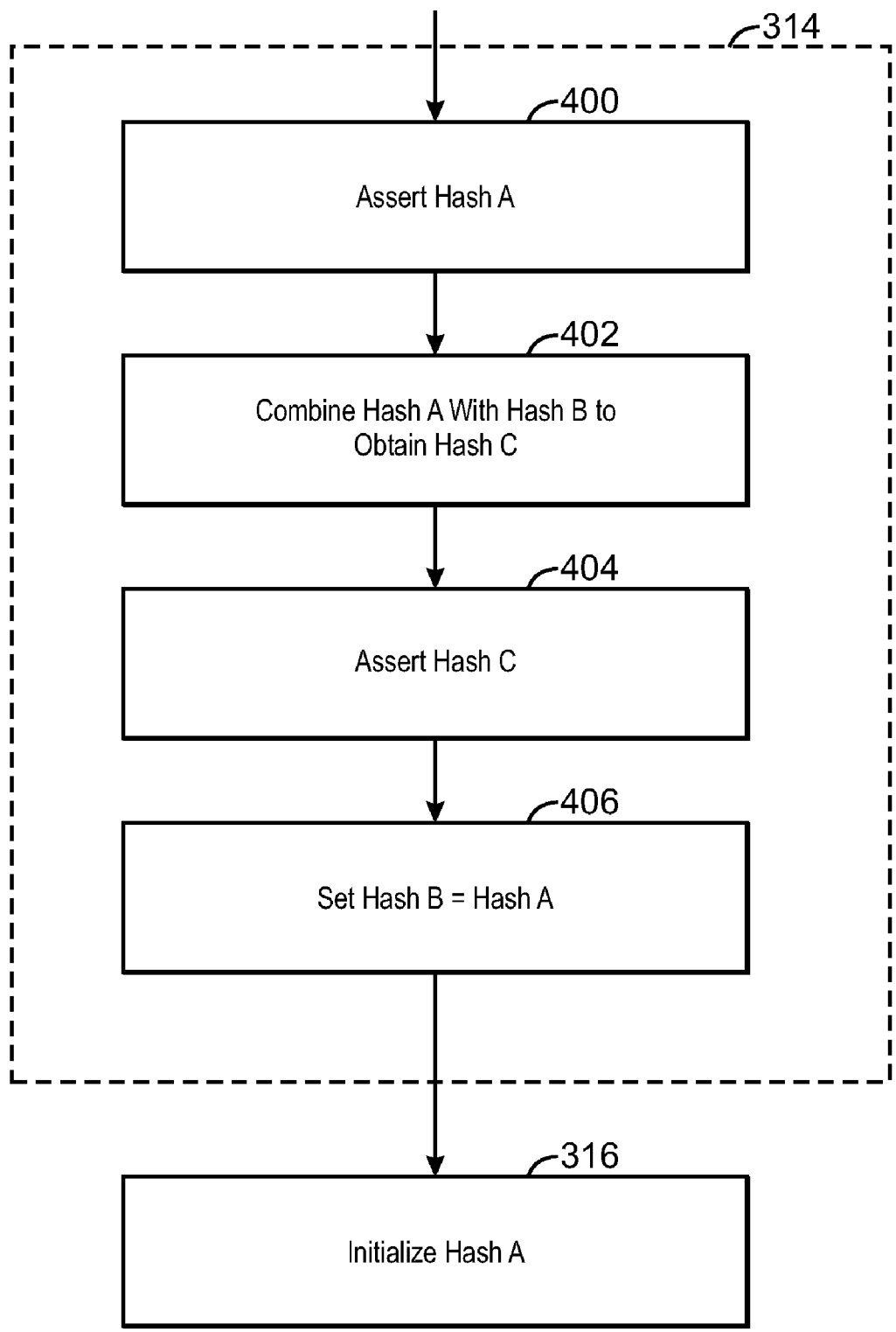
FIG. 4 is a process flow diagram of a method of generating a multiple-word hash value, in accordance with exemplary embodiments of the present invention.

FIG. 4 is a process flow diagram of a method of generating a multiple-word hash value, in accordance with exemplary embodiments of the present invention. For the purpose of clarity, the method as described provides for the generation of two-word hash values. However, it will be appreciated that the method may also be extended to include additional hash values for combinations of three or more words. According to the exemplary embodiment shown in FIG. 4, asserting the hash value at block 314 may involve various steps, in which several hash values may be generated and asserted. At block 400, the hash value, "hash A," may be asserted. Hash A may represent the current hash value that has been generated during the scan of the current single token, as described in relation to FIG. 3. Hash A may be asserted in the same manner of asserting hash values described above in relation to FIGS. 2 and 3. Furthermore, if hash A represents the first hash value being asserted for the document, hash B may be initialized, for example, set to zero, and blocks 402 and 404 described below may be skipped.

At block 402, hash A may be combined with hash B to generate hash C. Hash B represents the previous single-word token that was asserted during the previous execution of block 314. Hash C represents the combination of the current hash value and the previous hash value. In some embodiments, the two-word hash value, hash C, is generated by combining hash A and hash B via an XOR operation. In some embodiments, combining hash A and hash B includes shifting hash A or hash B to the left or right by one bit before combining the two hash values. Also, any of the methods described with respect to step 310 may be used to perform this combination. In this way, hash C may be differentiated according to the order that the tokens appear in the document 118. In some embodiments, prior to step 402, hash A is looked up in a "stopword array" (or other such representation) of Boolean values. If the corresponding position has the value "true," the remainder of block 308 may be skipped.

At block 404, hash C may be asserted in the same manner of asserting hash values described above in relation to FIGS. 2 and 3. In some exemplary embodiments, both the single-word hash values and the two-word hash values are asserted to a single feature vector. Furthermore, the techniques used to assert word hashes may be different from the techniques used to assert phrase hashes. In some exemplary embodiments, collisions between single-word tokens and two-word tokens are reduced or avoided by using a collision reduction technique, as described below.

In one exemplary collision reduction technique, single-word hash values may be asserted to a first feature vector and the two-word features may be asserted to a second feature vector. In another exemplary collision reduction technique, a single feature vector may be partitioned into a single-word segment and a two-word segment. In this case, hash A may be asserted to the single-word segment and hash B may be asserted to the two-word segment. In some exemplary embodiments, the feature vector is divided into two equal segments controlled by the first bit of the hash value, which is reserved for partitioning the feature vector. In this case, before asserting the hash value, the first bit of the hash value may be set according to whether it represents a single-word token or a two-word token. For example, at block 400 the first bit of hash A may be set zero, and at block 404 the first bit of hash C may be set to one). Furthermore, the relative size of the feature vector segments may be varied by reserving more than one bit for the partitioning of the feature vector. For example, if the first two bits are reserved for partitioning, three of the bit combinations may be reserved for single word tokens, and the remaining bit combination may be reserved for two-word tokens. For example, at block 400 the first two bits of hash A may be set to zero, and at block 404 the first two bits of hash C may be processed to ensure that the first two bits are not both zero, such as by setting the first bit to one whenever the first two bits of hash C are zero. In some embodiments, the modification takes place during or after the assertion of the hash value, but prior to using the hash value as an index into a data structure. This enables the modification to happen subsequent to reduction of the hash code based on the data structure being used.

At block 406, hash B is set to be equal to hash A, in preparation for the next time block 314 is executed. In some embodiments, block 404 is performed only after a certain number of times that block 402 has been performed. In such embodiments, hash B may be set to zero at block 406 if block 404 was performed, and hash B may be set to hash C if block 404 was not performed.

In some embodiments, hash C is replaced by a list of hashes, the list starting out empty. In such embodiments, block 400 is omitted. At block 402, hash A is combined with each hash in the list. Following block 402, hash A is appended to the list, and in block 404, each hash is asserted. In another embodiment, block 400 is performed and hash A is appended to the list following block 404 rather than following block 402. In some such embodiments, a ring buffer or other data structure may be used to impose a maximum length on the list.

Figure 5:
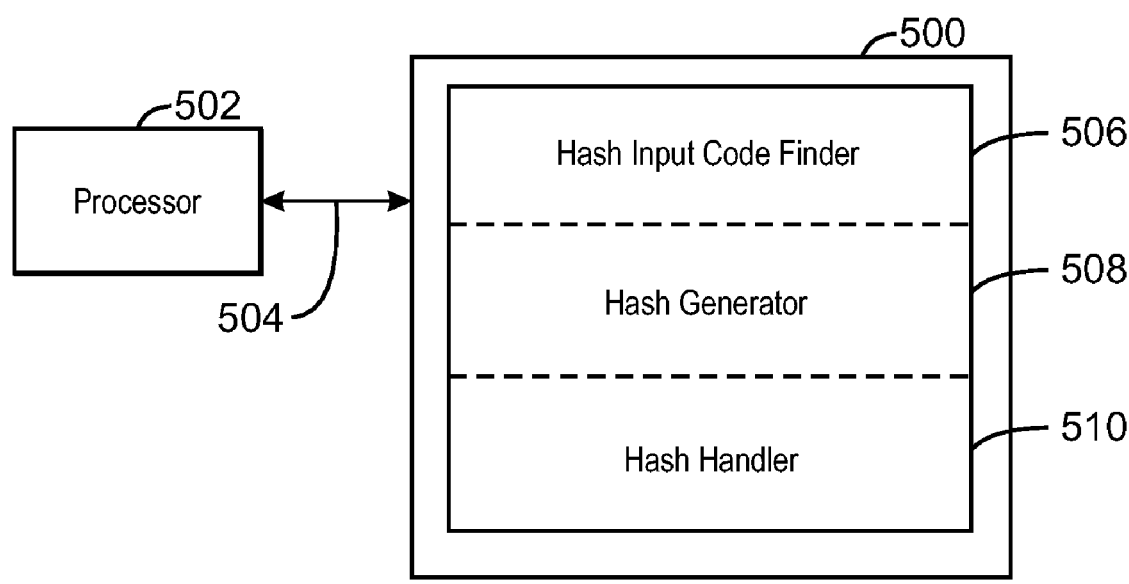
FIG. 5 is a block diagram showing a tangible, machine-readable medium that stores code configured to generate a user profile using the reduce-rank classification structure, in accordance with an exemplary embodiment of the present invention.

FIG. 5 is a block diagram showing a tangible, machine-readable medium that stores code configure to process an electronic text document 118, in accordance with an exemplary embodiment of the present invention. The tangible, machine-readable medium is referred to by the reference number 500. The tangible, machine-readable medium 500 can include RAM, a hard disk drive, an array of hard disk drives, an optical drive, an array of optical drives, a non-volatile memory, a universal serial bus (USB) drive, a digitally versatile disk (DVD), a compact disk (CD), and the like. Further, the tangible, machine-readable medium 500 may be located in computer system 102. In one exemplary embodiment of the present invention, the tangible, machine-readable medium 500 can be accessed by a processor 502 over a communication channel 504.

The various software components discussed herein can be stored on the tangible, machine-readable medium 500 as indicated in FIG. 5. For example, a first block 506 on the tangible, machine-readable medium 500 may include a hash input code finder configured to receive a character from an electronic text document 118 and obtain a hash input code corresponding to the character from the character map. A second block 508 can include a hash generator configured to modify a hash value based on the hash input code if the hash input code indicates that the character is part of a token (e.g. by being non-zero). A third block 510 can include a hash handler configured to assert the hash if the hash input code indicates that the character is not part of a token. The tangible, machine-readable medium 500 may also include other software components, for example, a comparator configured to compare a search vector to a reverse index to identify a matching document within the reverse index that includes one or more of the search terms used to generate the search vector. Although shown as contiguous blocks, the software components can be stored in any order or configuration. For example, if the tangible, machine-readable medium 500 is a hard drive, the software components can be stored in non-contiguous, or even overlapping, sectors.

What is claimed is:

1. A computer-implemented method for processing an electronic text document by performing a scan, the method comprising:

obtaining a character from the document;

obtaining a hash input code from a character map, the hash input code corresponding to the character;

modifying a hash value based on the hash input code if the hash input code indicates that the character is part of a token; and asserting the hash value if the hash input code indicates that character is not part of a token.

2. The computer implemented method of claim 1, wherein the character map comprises a plurality of hash input codes that are deterministic randomized values, and at least one hash input code is indicative of a corresponding character being a non-token character.

3. The computer implemented method of claim 2, wherein the hash input codes are identical for interchangeable characters.

4. The computer implemented method of claim 1, wherein asserting the hash value comprises modifying a feature vector value at a position in the feature vector corresponding to the hash value.

5. The computer implemented method of claim 1, comprising identifying a document class of the electronic text document based, at least in part, on the hash value, and automatically performing an action by a computer based on the identified document class.

6. The computer implemented method of claim 1, wherein asserting the hash value comprises obtaining a weight value from a position in an array of weights corresponding with the hash value.

7. The computer implemented method of claim 1, wherein asserting the hash value comprises incrementing a token count.

8. The computer implemented method of claim 1, wherein asserting the hash value comprises obtaining a weight value from a position in an array of weights corresponding with the hash value and adding the weight to a classification score.

9. The computer implemented method of claim 1, wherein the scan comprises obtaining a character class associated with the character from the character map and asserting the hash if the character class does not match a most recent character class.

10. The computer implemented method of claim 1, wherein asserting the hash comprises combining the hash value with a previously asserted hash value to obtain a second hash value corresponding with a two token phrase and asserting the second hash value.

11. The computer implemented method of claim 1, wherein asserting the hash comprises storing the hash value in an index record, the method comprising adding the index record in a reverse index.

12. A computer system, comprising:
a processor that is configured to execute machine-readable instructions;
a storage device that is configured to store data, the data comprising a character map that includes character indicators and associated hash input codes; and
a memory device that stores instructions that are executable by the processor, the instructions comprising:
a hash input code finder configured to receive a character from an electronic text document and obtain a hash input code corresponding to the character from the character map;
a hash generator configured to modify a hash value based on the hash input code if the hash input code indicates that the character is part of a token; and
a hash handler configured to assert the hash if the hash input code indicates that the character is not part of a token.

13. The computer system of claim 12, wherein the character map comprises a plurality of hash input codes that are deterministic randomized values, and at least one hash input code is indicative of a corresponding character being a non-token character.

14. The computer system of claim 12, wherein asserting the hash comprises adding the hash value to an index record, and the system comprises an index compiler configured to add the index record to a reverse index.

15. The computer system of claim 14, wherein:
the hash input code finder is configured to receive another character from a search phrase comprising one or more search terms and obtain another hash input code corresponding to the other character from the character map;
the hash generator is configured to modify a second hash value based on the other hash input code; and
the hash handler is configured to store the second hash value to a search vector.

16. The computer system of claim 15, comprising a comparator configured to compare the search vector to the reverse index to identify a matching document within the reverse index that includes one or more of the search terms.

17. The computer system of claim 12, wherein asserting the hash comprises modifying a feature vector based on the hash value, and the computer system comprises a classification score generator configured to compute a classification score for the document based, at least in part, on the feature vector.

18. A tangible, computer-readable medium, comprising code configured to direct a processor to:
receive a character obtained from an electronic text document and obtain a corresponding hash input code from the character map;
modify a hash value based on the hash input code if the hash input code indicates that the character is part of a token; and
assert the hash value if the hash input code indicates that the character is not part of a token.

19. The tangible, computer-readable medium of claim 18, wherein asserting the hash value comprises modifying a feature vector value at a location in the feature vector corresponding to the hash value.

20. The tangible, computer-readable medium of claim 18, wherein asserting the hash comprises adding the hash value to an index record, and the tangible, computer-readable medium comprises code configured to direct the processor to sort the index record and add the index record to a reverse index.

* * * * *